United States Patent [19]

Sugden

[11] Patent Number: 4,728,841
[45] Date of Patent: Mar. 1, 1988

[54] DUAL PERMANENT MAGNET GENERATOR CONSTRUCTION

[75] Inventor: Kenneth B. Sugden, Rockford, Ill.

[73] Assignee: Sundstrand Corporation, Rockford, Ill.

[21] Appl. No.: 874,953

[22] Filed: Jun. 16, 1986

[51] Int. Cl.⁴ .............................................. H02K 16/00
[52] U.S. Cl. ...................................... 310/114; 310/83; 310/112; 310/156; 290/6; 322/40
[58] Field of Search ................. 310/112, 165, 114, 83, 310/126, 191, 209, 156; 190/4 A, 4 C, 4 D, 6; 74/686; 322/29, 40

[56] References Cited

U.S. PATENT DOCUMENTS

| | | | |
|---|---|---|---|
| 1,255,486 | 2/1918 | Storer | 310/112 |
| 1,292,592 | 1/1919 | Ferris | 310/112 |
| 3,174,065 | 3/1965 | Jaun | 310/112 |
| 3,204,138 | 8/1965 | Mabuchi . | |
| 3,233,133 | 2/1966 | Kober . | |
| 3,233,135 | 2/1966 | Holzer | 310/209 |
| 3,268,749 | 8/1966 | Matsuo | 310/112 |
| 3,576,143 | 4/1971 | Baits | 74/687 |
| 3,713,015 | 1/1973 | Frister . | |
| 3,717,780 | 2/1973 | Hohne, Jr. et al. . | |
| 3,728,904 | 4/1973 | Boyriven . | |
| 3,757,149 | 9/1973 | Holper . | |
| 3,790,833 | 2/1974 | Hasebe | 310/114 |
| 3,863,084 | 1/1975 | Hasebe . | |
| 4,110,649 | 8/1978 | Mas . | |
| 4,169,983 | 10/1979 | Felder . | |
| 4,305,031 | 12/1981 | Wharton . | |
| 4,447,737 | 5/1984 | Cronin | 290/6 |
| 4,476,395 | 10/1984 | Cronin | 310/83 |

FOREIGN PATENT DOCUMENTS 2753585  6/1979  Fed. Rep. of Germany .
1092732 11/1967  United Kingdom ................ 310/112

OTHER PUBLICATIONS

Two sheets of drawings 12,641 of '94 (entire patent in Archives).

Primary Examiner—R. Skudy
Attorney, Agent, or Firm—Wood, Dalton, Phillips, Mason & Rowe

[57] ABSTRACT

Difficulties in precisely and easily adjusting the relative position of two rotors, 72, 104, 206, 226 in a dual permanent magnet generator are avoided in a structure including first and second side by side armatures 92, 108, 218, 230 with the rotors 72, 104, 212, 226 journalled therewithin. A common drive 10, 206 is provided for the rotors 72, 104, 212, 226 and there is further included a control device 80, 250, for angularly shifting at least one of the rotors 72, 104, 212, 226 relative to the common drive 10, 206.

9 Claims, 4 Drawing Figures

DUAL PERMANENT MAGNET GENERATOR CONSTRUCTION

FIELD OF THE INVENTION

This invention relates to a permanent magnet generator, and more specifically, to a permanent magnet generator having two, relatively movable, permanent magnet rotor assemblies in side by side relation.

BACKGROUND OF THE INVENTION

Permanent magnet generators of the type having a rotor made up of two relatively movable permanent magnet rotor bodies have been proposed generally to provide for voltage regulation in response to changes in loading on the generator. They have also been employed for regulating voltage to compensate for changes in the rate of rotor rotation.

Examples of such proposals can be found in U.S. Pat. Nos. 3,233,133 issued Feb. 1, 1966 to Kober; 3,713,015 issued Jan. 23, 1973 to Frister; and 4,305,031 issued Dec. 8, 1981 to Wharton. Typical of these constructions is an arrangement wherein one of the permanent magnet assemblies or rotor bodies is rigidly fixed to a rotor shaft and the other permanent magnet assembly or body is rotatable about the shaft relative thereto. Both are located in end to end relationship on a single axis.

By effecting relative rotation between the two rotor bodies, the output voltage of the generator may be varied as described more fully in such patents to achieve voltage regulation.

Those such systems should work well in theory. In practice, particularly in high speed generators as are utilized in aircraft generating systems, loading due to centrifugal force and other operational factors may render it difficult to achieve relatively precise angular adjustment of the movable permanent magnet rotor body with respect to the fixed permanent magnet rotor body unless a highly precise bearing arrangement is disposed between the two rotor bodies to support the shaft. Furthermore, because such prior art constructions utilize end to end rotors sometimes referred to as in-line rotors, the resulting generator package is relatively long and will create a large so called "overhung moment" when mounted in connection with an aircraft power plant in a cantilever fashion as is usual. This relatively large moment requires that the support for the generator be strengthened over what would be required for lesser overhung moment; and that inevitably leads to a weight increase which in turn decreases the useful load of the aircraft.

The present invention is directed to overcoming one or more of the above problems.

SUMMARY OF THE INVENTION

It is the principal object of the invention to provide a new and improved generator of the dual permanent magnet generator type. More specifically, it is an object of the invention to provide such a generator wherein two rotor bodies are disposed in side by side relation to eliminate the need for sophisticated bearings heretofore found in in-line dual permanent magnet generators and/or lessen the overhung moment when installed in an aircraft, for example, by shortening the overall length of the generator package.

An exemplary embodiment of the invention achieves the foregoing objects in a construction including stator means including first and second side by side armatures. First and second permanent magnet rotors are journalled for rotation within respective ones of the first and second armatures about parallel axes of rotation. A common drive is provided for the rotors and there is a control means for angularly shifting at least one of the rotors relative to the common drive.

In a preferred embodiment, one of the rotors is of considerably lesser mass than the other of the rotors and the other rotor is non-shiftable with respect to the common drive. Thus, adjustment of the angular position occurs on the one rotor of lesser mass and because the lesser meass is more easily affected at high rates of rotation.

In addition, the side by side relationship of the rotors and the armatures reduces the length of the generator package so that, when installed, a lesser overhung moment results.

According to another embodiment of the invention, the control means angularly shifts both of the rotors relative to the common drive, generally equal angular distances and in opposite directions.

In this embodiment, the control means comprises a pair of coupled mechanisms operable upon receipt of an input signal to cause the angular shifting of the rotors and the common drive drives the first rotor through one of the mechanisms and drives the second rotor through the other of the mechanisms.

In this embodiment, the common drive comprises a journalled shaft on which the first rotor is in turn journalled for rotation about one of the parallel axes. The shaft is axially movable along such axis and the mechanisms include helical splines responsive to movement of the shaft.

A high preferred embodiment of the invention contemplates first and second side by side armatures defining stator means and first and second permanent magnet rotor bodies respectively journaled for rotation in side by side relation about parallel axes. The first rotor body is of considerably lesser mass than the second rotor body and is journalled on a shaft defining one of the axes. The control mechanism interconnects the shaft and the first rotor body and is operable to adjust the angular position of the rotor body on the shaft and to couple the first rotor body to the shaft for rotation therewith. A single drive unit provides for rotation of the shaft and the rotation of the second rotor body about the other of the parallel axes.

According to this embodiment, an additional permanent magnet rotor body is rotatable about one of the axes and is driven by the drive unit and there is provided an additional armature for the additional rotor body. The additional armature is adapted to provide an electrical output to a generator control unit.

This same embodiment also contemplates the use of a constant speed drive as the drive unit which is of the type including a differential having an output ring gear. The ring gear is operative to drive the shaft and the second rotor body.

Other objects and advantages will become apparent from the following specification taken in connection with the accompanying drawings.

DESCRIPTION OF THE PREFERRED EMBODIMENTS

Figure 1A:
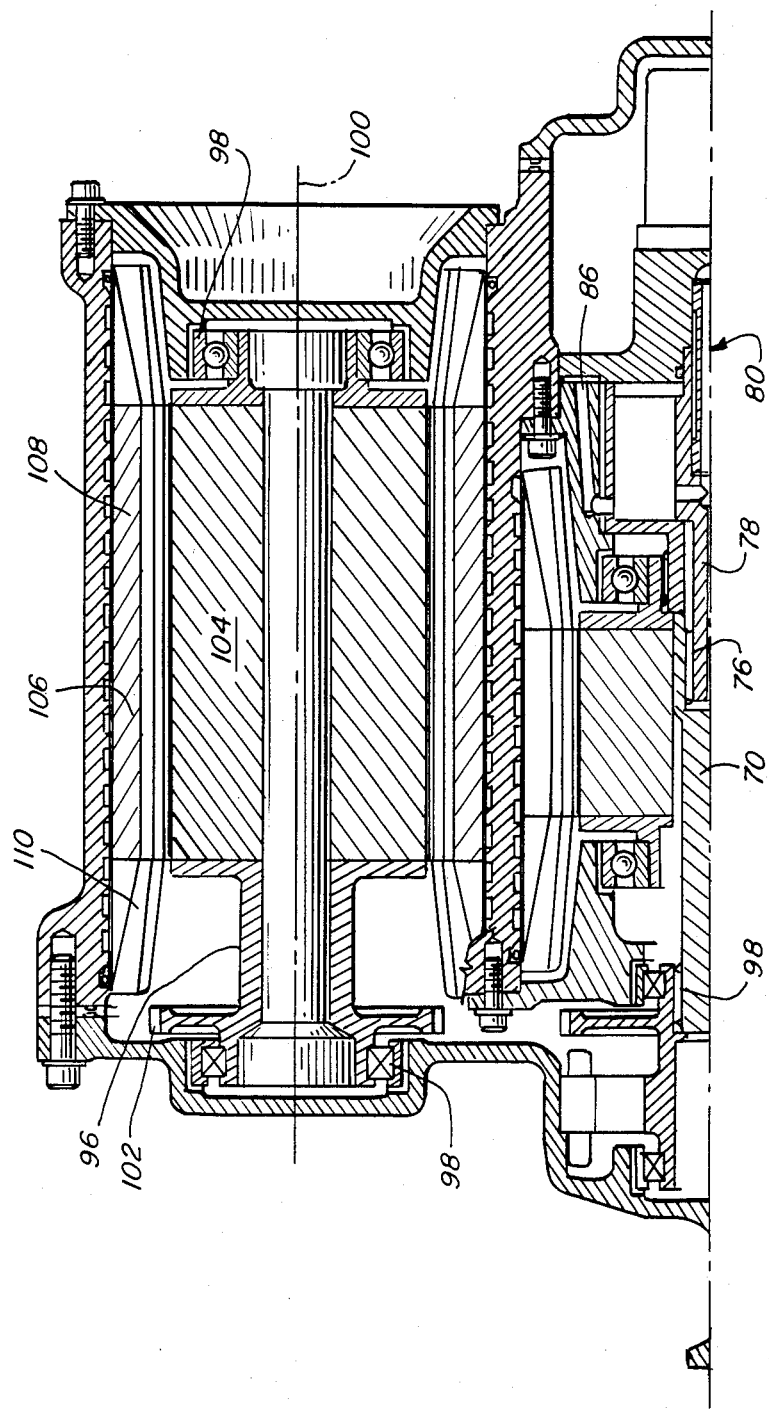
FIG. 1 is a sectional view of a dual permanent magnet generator made according to the invention in assembly with a constant speed drive and is composed of FIGS. 1a and 1b, the latter to be located below the former.
Figure 1B:
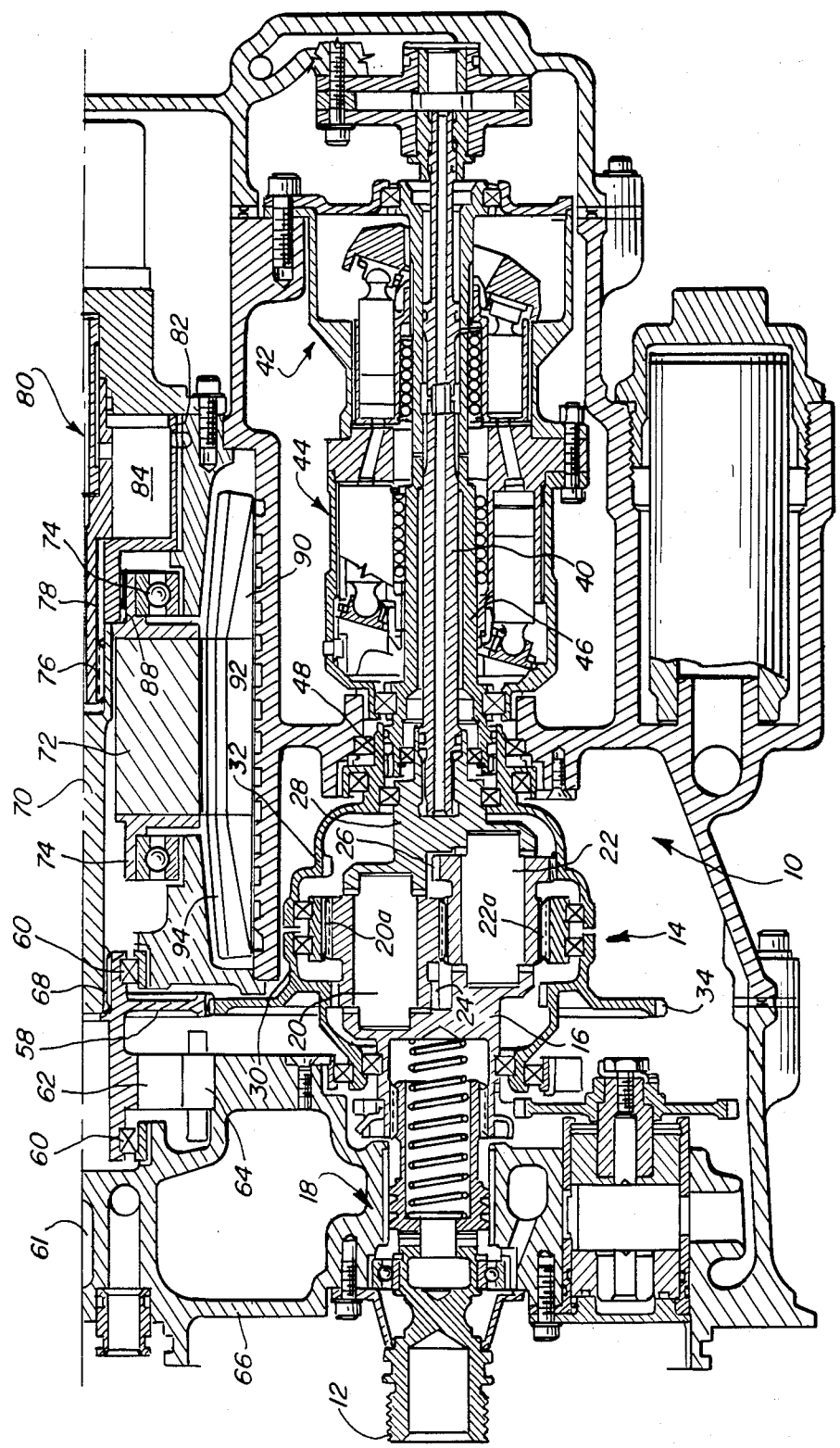
Figure 2:
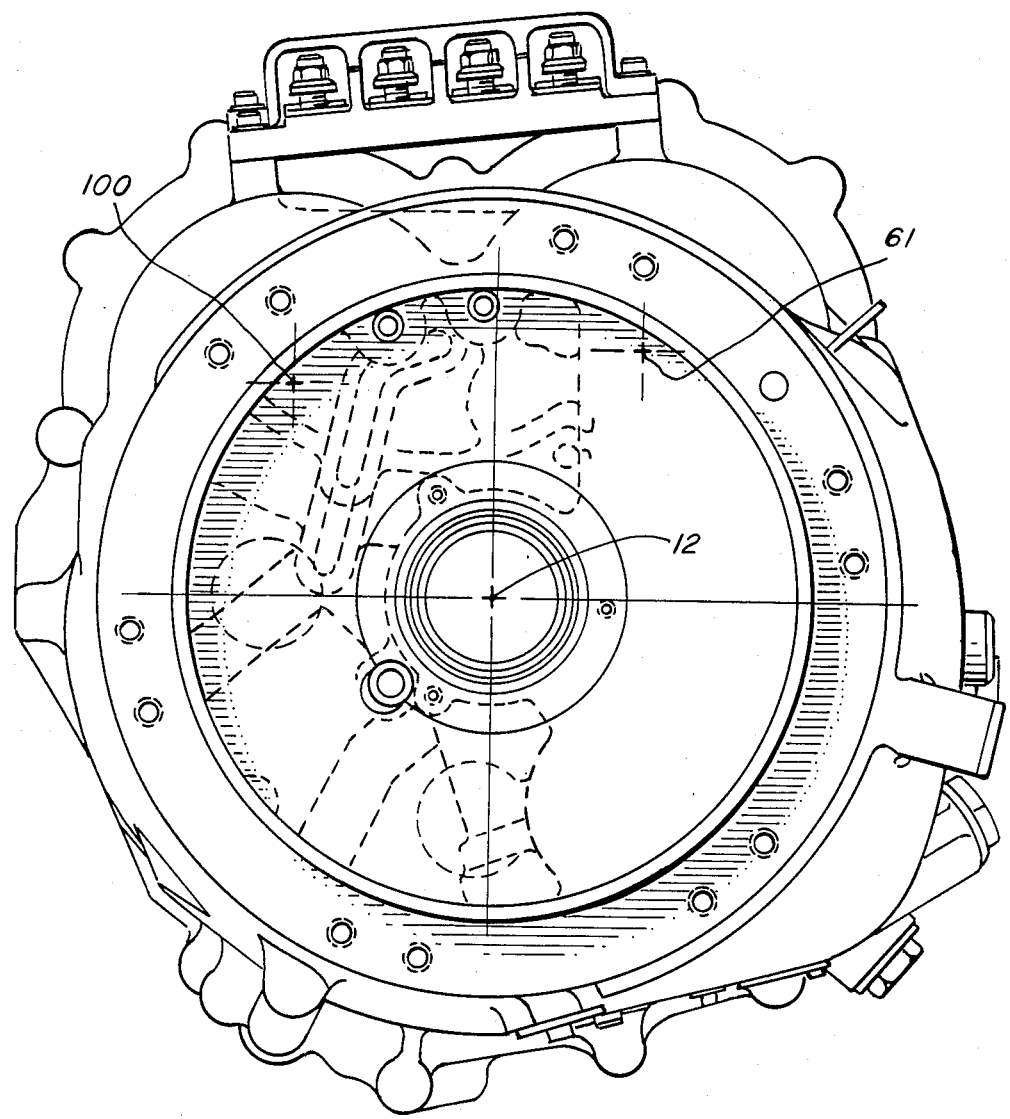
FIG. 2 is an end view of the embodiment illustrated in FIGS. 1a and 1b.

An exemplary and preferred embodiment of the invention is illustrated in FIGS. 1 and 2. With reference thereto, the same is shown in connection with a drive unit in the form of a constant speed drive unit, generally designated 10, having an input shaft 12, which is adapted to be connected to an aircraft engine or the like. In general terms, the constant speed drive unit 10, may be regarded as conventional and accordingly will be described only to the limited extent necessary to achieve a full understanding of the invention.

The constant speed drive unit 10 includes a differential, generally designated 14, having a carrier 16, coupled to the input shaft 12 by an electrically or mechanically operated disconnect, generally designated 18. However, if desired, a thermal disconnect of known construction could be used in lieu of that specifically illustrated.

The differential 14 includes first and second meshed gears 20 and 22 which are meshed at their center portions 20a and 22a and include respective reduced diameter teeth 24 and 26 adjacent their left and right hand ends, respectively, as viewed in FIG. 1b. The gears 20 and 22 are journalled for rotation about their respective axes as well as for revolution about the axis defined by the input shaft 12 by the carrier 16 on their left hand side and a complementary carrier 28 on their right hand side as viewed in FIG. 1b.

The differential further includes first and second ring gears 30 and 32. The ring gear 30 is meshed with the reduced diameter gear 24 on the gear 20 while the ring gear 32 is meshed with the reduced diameter gear 26 on the gear 22. Furthermore, the ring gear 30 is provided with external teeth as at 34 to serve as an output ring gear for purposes to be seen.

The complementary carrier 28 is coupled by any suitable means to a shaft 40 which drives a variable displacement hydraulic unit, generally designated 42, of conventional construction and of the general type illustrated in commonly owned U.S. Pat. No. 3,576,143 issued Apr. 27, 1971 to Baits. A conventional fixed displacement hydraulic unit, generally designated 44, when acting as a hydraulic motor, receives hydraulic fluid from the variable displacement hydraulic unit 42 which is coaxial with the unit 44. The fixed hydraulic unit 44 likewise is of the type described in the previously identified United States Letters Patent to Baits. A shaft 46 concentric about the shaft 40 is connected to the fixed hydrualic unit 44 and in turn is splined as at 48 to the ring gear 32.

By conventional control of the displacement of the variable displacement unit 42, the output ring gear 30 will be driven at a constant speed regardless of the rotational rate of the input shaft 12, and reference may be had to the previously identified Baits patent for a full description of how such function is obtained.

Returning now to the external teeth 34 on the output ring gear 30, the same are meshed with a gear 58 journalled for rotation by bearing 60 about an axis 61 parallel to that defined by the input shaft 12. The gear 58 may mount a permanent magnet rotor body 62 rotatable with a stator 64 mounted on the housing 66 of the system. The permanent magnet generator just defined is utilized to provide power to a conventional generator control unit (not shown).

Splines 68 also connect the gear 58 to a shaft 70 on the axis 61 of rotation of the gear 58. As viewed in FIGS. 1a and 1b, the shaft 70 extends through a permanent magnet rotor body 72 journalled by a bearing 74 and is splined as at 76 to the shaft 78 of a control unit, generally designated 80.

The control unit 80 is of the type disclosed in my commonly assigned, co-pending application Ser. No. 813,498, entitled Self-Powered Hydraulic Rotary Actuator, filed Dec. 26, 1985, the details of which are herein incorporated by reference. As therein described, the control unit 80 includes a rotatable housing 82 and a vane 84 is located within the housing 82 and is affixed to the shaft 78. Fluid passages for receiving an input signal such as the one shown at 86 in FIG. 1a are operable to provide fluid under pressure to one or the other of the sides of the vane 84 to thereby rotate the shaft 78 within the housing 82 and thereby change the angular relationship between the shaft 78 and the exterior of the housing 82. The latter is splined as by splines 88 to the permanent magnet rotor body 72. Thus, by changing the position of the vane 84 within the housing 82 as the latter rotates when driven by the shaft 70, the angular position of the rotor body 72 relative to the shaft 70 is changed.

The rotor body 72 is rotatable within a stator 90 including an armature 92 and stator windings 94. Power induced in the windings 94 is utilized elsewhere as one of the main power outputs of the generator.

Referring to FIG. 1a, a shaft 96 is journalled as by bearings 98 for rotation about an axis 100 which is parallel to the axis of rotation 61 of the gear 58 as well as the axis of rotation of the input shaft 12. The shaft 96 mounts a gear 102 which, in the preferred embodiment, is meshed with the external gear teeth 34 on the output ring gear 30 as can be appreciated from the relationship of the axis 100 (FIG. 2) to the input shaft 12. However, the gear 102 could be driven by the gear 58 via an idler if desired.

The shaft 96 mounts a permanent magnet rotor body 104 which is disposed within a stator 106 having an armature 108 and windings 110. Frequently, the windings 110 will be connected in series with the windings 94 for voltage regulation purposes.

In any event, this construction provides for rotation of the rotor body 104 within the stator 106 when the shaft 96 is driven. It will also be appreciated that the rotor body 104 is firmly affixed to the shaft 96 and thus its angular position with respect thereto cannot be changed.

A consideration of the sizes of the rotor body 72 and 104 as shown in FIGS. 1b and 1a, respectively, illustrates that the rotor body 72 is considerably smaller than the rotor body 104. While size in terms of volume is not extremely material to the invention, size in terms of the difference in mass is. The mass of the rotor body 72 is considerably less than the mass of the rotor body 104. And it is the rotor body 72 whose angular position with respect to rotating components in remainder of the system can be altered. Because the rotor body 72 is a relatively low mass component, even when the generator is operating at high speeds as is typical of aircraft generators which frequently operate at 12,000 rpm or even 24,000 rpm, the loading on the rotor body 72 due to operational forces is much lower than that on other system components because of the lower mass. As a consequence, it is much easier to effect precision adjustment of the angular position of the rotor body 72 with respect to other system components, including specifically, the rotor body 104. Thus, precision voltage regulation can be achieved.

Figure 3:
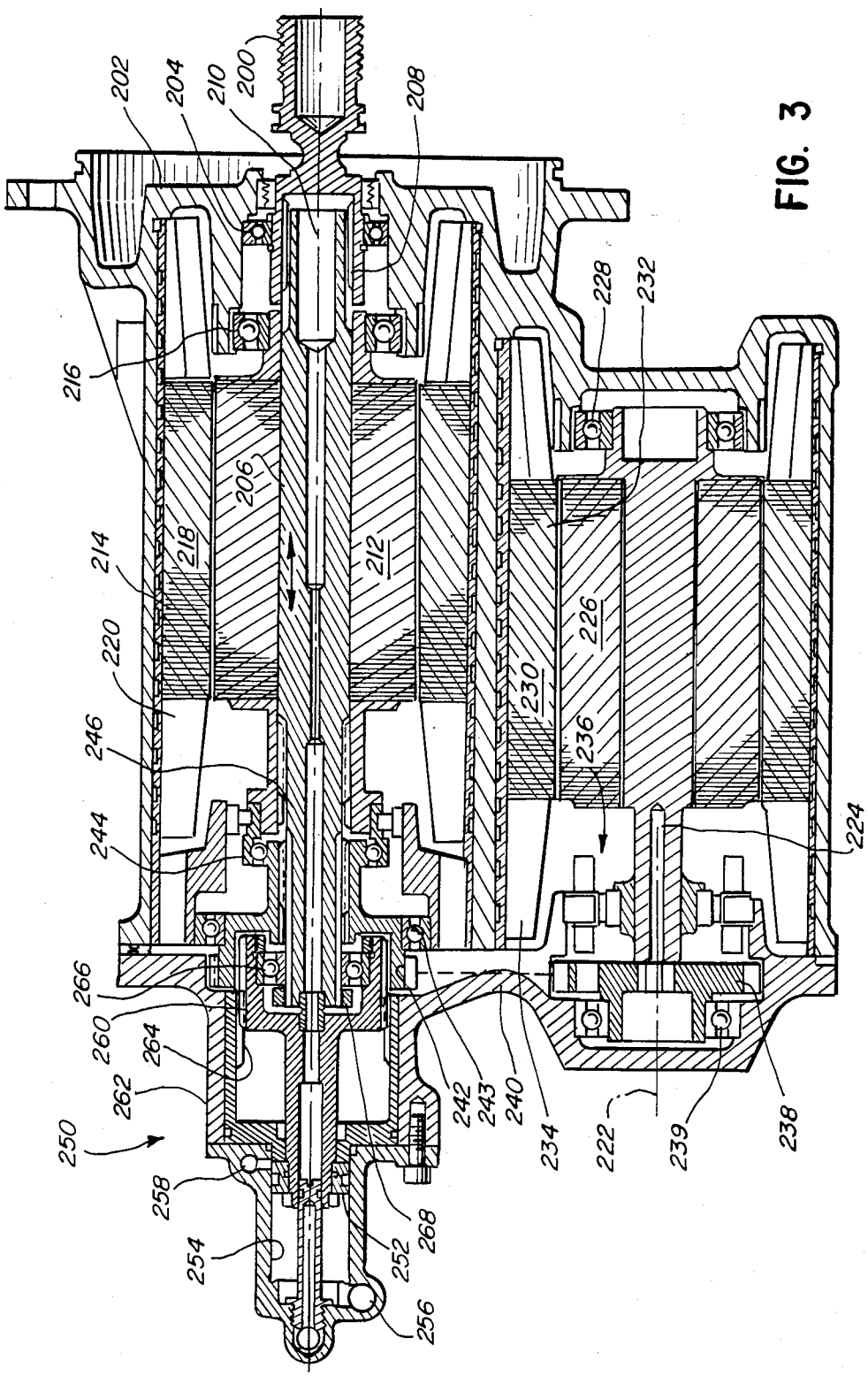
FIG. 3 is a sectional view similar to FIGS. 1a and 1b, but without the constant speed drive and illustrating a modified embodiment of the invention.

In some instances, it may be desired that both of the permanent magnet generators be of the same mass. Such a generator is illustrated in FIG. 3 and is seen to include an input shaft 200 journalled in a housing 202 by bearings 204. A shaft 206 is splined to the input shaft 200 at 208 and is axially movable along its rotational axis 210.

Concentric about the shaft 206 is a permanent magnet rotor body 212 which is journalled for rotation within a stator 214 by bearings 216. The stator 214 has an armature 218 and windings 220.

A parallel rotational axis shown at 222 is occupied by a shaft 224 mounting a rotor body 226 identical to the rotor body 212. The shaft 224 is journalled as by bearings 228 and the rotor body 226 is affixed to the shaft 224 for rotation therewith. The rotor body 226 is also rotatable within the armature 230 of a stator 232 having windings 234. The stators 214 and 232 are identical and typically will be connected in series.

A small permanent magnet generator 236 is carried by the shaft 224 and is utilzed to provide power to a generator control unit (not shown) in the same fashion as the permanent magnet generator defined by the rotor body 62 and the stator 64 shown in FIG. 1b.

An end of the shaft 224 is coupled to a gear 238 which is journalled by bearings 239 for rotation about the axis 222.

The gear 238 is coupled by any suitable means, shown schematically at 240, to a gear 242 concentric about the shaft 206 and journalled be bearings 243. The gear 242 is splined by helical splines 244 to the shaft 206. Similar, but oppositely pitches splines 246 interconnect the shaft 206 and the rotor body 212. As a consequence of this construction, axial movement of the shaft 206 will result in the gear 242 and the rotor body 212 angular shifting about the axis of the shaft 206. Where the pitches of the splines 244 and 246 are dual and opposite, the angular shifting will be an equal number of degrees but in opposite directions.

And since the gear 242 is coupled to the second rotor body 226, where equal gear ratios are utilized, this will result in equal but opposite angular displacement of the rotor bodies 212 and 226 in the electrical sense. Thus, by this means, voltage regulation can be achieved.

To provide for axial shifting of the shaft 206, a control unit, generally designated 250, is provided. The control unit 250 receives an input signal and is generally similar, but not identical, to the hydraulic actuator disclosed in my commonly assigned co-pending application Ser. No. 812,254, filed Dec. 23, 1985, entitled Hydraulic Actuator, the details of which are herein incorporated by reference. It includes a piston 252 which is double acting within a cylinder 254 by reason of the provision of fluid ports 256 and 258 at opposite ends thereof. The piston 252 is coupled to a cup shaped yoke 260 axially movable within a fixed housing 262 and fixed against rotation relative thereto by splines 264. Within the cup shaped yoke, bearings 266 are disposed and the same are fixedly connected as by a shoulder 268 to the shaft 206. Thus, the axial position of the shaft 206 as it rotates can be adjusted by applying fluid to the cylinder 254 through one or the other of the ports 256 and 258. Such adjustment will, of course, change the phasing between the rotor bodies 212 and 226 as mentioned previously to provide voltage regulation as desired.

Because the system components are of equal mass in this embodiment of the invention, and their movement is in opposite directions, and in a preferred embodiment, in equal amounts, forces that exist by virtue of operation of the generator which tend to resist movement of one of the rotors act oppositely on the other rotor and thus counteract each other allowing relative rotor position to be easily and precisely adjusted with a minimum of energy expenditure.

I claim:

1. A generator comprising:
   stator means including first and second side by side armatures:
   first and second permanent magnet rotors journalled for rotation within respective ones of said first and second armatures about parallel axes of rotation;
   a common drive for said rotors; and
   control means for angularly shifting both of said rotors relative to said common drive and in equal angular distances in opposite directions;
   said control means comprising a pair of coupled mechanisms operable upon receipt of an input signal to cause the angular shifting of said rotors and said common drive drives said first permanent magnet rotor through one of said mechanisms and drives said second permanent magnet rotor through the other of said mechanisms.

2. The generator of claim 1 wherein said common drive comprises a journalled shaft on which said first permanent magnet rotor is in turn journalled for rotation about one of said parallel axes.

3. The generator of claim 2 wherein said shaft is axially movable along said one parallel axis and said mechanisms include helical splines responsive to movement of said shaft.

4. A generator comprising:
   stator means including first and second side by side armatures;
   first and second permanent magnet rotors journalled for rotation within respective ones of said first and second armatures about parallel axes of rotation;
   a common drive for said rotors; and
   control means for angularly shifting one of said permanent magnet rotors relative to said common drive;
   said one permanent magnet rotor being of considerable lesser mass than the other of said permanent magnet rotors, said other permanent magnet rotor being non-shiftable with respect to said common drive.

5. The generator of claim 4 wherein said common drive includes a rotatable element positively engaging and driving said other permanent magnet rotor and positively engaging and driving said one permanent magnet rotor through said control means.

6. A generator comprising
   first and second side by side armatures defining stator means;
   first and second permanent magnet rotor bodies respectively journalled for rotation within respective armatures in side by side relation about parallel axes;
   said first permanent magnet rotor body being of considerably lesser mass than said second permanent magnet rotor body and being journalled on a shaft defining one of said axes;

a control mechanism interconnecting said shaft and said first permanent magnet rotor body and operable to adjust the angular position of said permanent magnet rotor body on said shaft and to couple said first permanent magnet rotor body to said shaft for rotation therewith; and a single drive unit for (a) rotating said shaft, and (b) rotating said second permanent magnet rotor body about the other of said parallel axes.

7. The generator of claim 6 further including an additional permanent magnet rotor body rotatable about one of said axes and driven by said drive unit, and an additional armature for said additional permanent magnet rotor body and adapted to provide an electrical output to a generator control unit.

8. The generator of claim 6 wherein said drive unit comprises a constant speed drive including a differential having an output ring gear, said ring gear driving said shaft and said second permanent magnet rotor body.

9. A generator comprising first and second side by side armatures defining stator means;

first and second permanent magnet rotor bodies respectively journalled for rotation in respective armatures in side by side relation about parallel axes;

a rotatable shaft defining one of said axes and axially movable therealong;

a control unit connected to said shaft and operable to control the position of said shaft along said one axes;

the first of said permanent magnet rotor bodies being journalled on said shaft for rotation relative thereto;

first spline means interconnecting said first permanent magnet rotor body and said shaft such that axial movement of said shaft will effect relative rotation between said first permanent magnet rotor body and said shaft;

a gear journalled about said one axis and in driving relation to said second permanent magnet rotor body;

second spline means interconnecting said shaft and said gear such that axial movement of said shaft will effect relative rotation between said gear and said shaft to thereby alter the angular relationship between said shaft and said second permanent magnet rotor body;

said first and second spline means being such that said permanent magnet rotor bodies will shift equal angular distances in opposite elective directions for a given axial movement of said shaft; and means connected to said shaft for rotating the same.

* * * * *